United States Patent [19]

Schneider

[11] Patent Number: 4,566,988

[45] Date of Patent: Jan. 28, 1986

[54] PROCESS FOR THE OXIDATION OF GASEOUS HYDROCARBONS

[75] Inventor: Ronald A. Schneider, Albany, Calif.

[73] Assignee: Chevron Research Company, San Francisco, Calif.

[21] Appl. No.: 591,751

[22] Filed: Mar. 21, 1984

[51] Int. Cl.$^4$ ............................................. C01B 3/34
[52] U.S. Cl. .................................................... 252/373
[58] Field of Search ................. 502/355, 238; 252/373

[56] References Cited

U.S. PATENT DOCUMENTS

| | | | |
|---|---|---|---|
| 3,926,781 | 12/1975 | Gale | 208/117 |
| 3,957,690 | 5/1976 | Boboleve et al. | 502/355 |
| 4,045,729 | 8/1977 | Loh | 422/98 |
| 4,172,810 | 10/1979 | Mitchell et al. | 502/302 |
| 4,205,194 | 5/1980 | Mitchell et al. | 585/419 |
| 4,239,658 | 12/1980 | Mitchell et al. | 502/302 |
| 4,323,482 | 4/1982 | Stiles et al. | 502/240 |
| 4,409,127 | 10/1983 | Keppel et al. | 502/355 |
| 4,415,440 | 11/1983 | Roberts et al. | 208/120 |
| 4,444,984 | 4/1984 | Jones et al. | 585/500 |

*Primary Examiner*—Natalie Trousor
*Assistant Examiner*—Bruce D. Gray
*Attorney, Agent, or Firm*—S. R. La Paglia; W. K. Turner; Q. T. Dickinson

[57] ABSTRACT

Gaseous hydrocarbons, especially methane, may be oxidized with high selectivity and efficiency essentially only to carbon monoxide and hydrogen by contacting them with gallium oxide at a temperature above 900° C.

12 Claims, No Drawings

PROCESS FOR THE OXIDATION OF GASEOUS HYDROCARBONS

FIELD OF THE INVENTION

This invention relates to the oxidation of gaseous hydrocarbons, and in particular to the oxidation of methane.

BACKGROUND OF THE INVENTION

The search for oil has, in many instances, resulted in the discovery of natural gas either alone or with crude oil deposits. This natural gas may contain up to 95% methane, usually in conjunction with minor proportions of heavier hydrocarbons such as ethane, propane, and butanes, and varying proportions of other gases such as nitrogen, carbon dioxide, hydrogen sulfide, etc. When this natural gas is found in a remote location, its value may be so low, because of difficulties of transportation to a point of use, that it is simply flared off to dispose of it. If it could be converted into a transportable form, however, the gas might become economically useful.

One possible use for natural gas is to convert it to methanol, which is liquid and therefore more easily transportable. This may be accomplished by conversion of the natural gas to synthesis gas (carbon monoxide and hydrogen) followed by a catalytic reaction between the hydrogen and carbon monoxide to produce methanol.

It is desirable, therefore, to develop methods for the production of synthesis gas from methane (and other lower hydrocarbons). A presently known process is steam reforming, according to the equation:

$$CH_4 + H_2O \rightleftharpoons CO + 3H_2$$

Other processes, producing different ratios of hydrogen to carbon monoxide, are also known. A process producing a ratio of carbon monoxide to hydrogen near 1:2, the stoichiometric ratio for methanol synthesis, is desirable, and it is also desirable that the process should minimize the production of carbon dioxide and water.

SUMMARY OF THE INVENTION

I have discovered that if a gaseous hydrocarbon is contacted with gallium oxide, the hydrocarbon is oxidized essentially only to carbon monoxide and hydrogen.

DETAILED DESCRIPTION OF THE INVENTION

At temperatures above about 900° C., methane reacts with gallium oxide to yield essentially only carbon monoxide and hydrogen, presumably according to the equation:

$$Ga_2O_3(s) + 3CH_4(g) \rightarrow 2Ga(s) + 3CO(g) + 6H_2(g)$$

The gallium oxide is preferably supported on a refractory oxide such as alumina, silica, etc., which is preferably of low surface area. Alumina is a particularly preferred support. The oxidant, if supported, can be readily prepared by techniques well known in the art for the addition of catalytic metals to catalyst supports, such as, for porous supports, impregnating the particulate support to incipient wetness with a solution of a gallium salt which can be decomposed to the oxide (e.g. gallium nitrate) followed by drying, or, for nonporous supports, depositing the salt by evaporation to dryness of the solution while tumbling the support. The resulting impregnated (or coated) support is then calcined at 300° C. or above.

Following an oxidation run, the oxidant may be regenerated by air oxidation at the operating temperature or another suitable temperature. The gallium metal produced by the reaction with methane reacts with oxygen to produce the gallium oxide again.

A cyclic process is thus conceivable, where the gallium oxide oxidant is contacted with methane, which is partially oxidized to synthesis gas, and the gallium metal is then reoxidized. Gaseous hydrocarbons other than methane may be similarly oxidized.

The oxidation produces a synthesis gas having an $H_2/CO$ ratio near 2.0, generally between 1.9 and 2.4, depending on the gaseous hydrocarbon. The $CO_2/CO$ ratio is generally less than 0.1, preferably less than 0.01.

The temperature at which the oxidation is performed is desirably at least 900° C. in order to obtain an adequate rate of reaction, though lower temperatures are possible. Higher temperatures are observed to increase the rate of reaction without affecting the selectivity, and are therefore desirable, but may pose problems of reactor materials and operation if the temperatures are greatly increased. Preferably, therefore, the temperature will be between 900° and 1100° C.

EXAMPLE

A gallium oxide on alumina oxidant containing 2% by weight gallium (as reduced metal) was prepared in the following manner. 2.65 g $Ga(NO_3)_3 \cdot 9H_2O$ (Alfa Grade 1) was dissolved in about 2.6 mL of distilled water at about 90° C. The resulting solution was mixed thoroughly (rotating and tumbling for 10 minutes) with 23.0 g of particulate alumina (Harshaw AL-3980T, 5/32") as a support, during which time it was completely absorbed by the support.

The impregnated alumina was heated in air, raising the temperature to 800° C. in several steps, to form the oxidant.

The oxidant, which had a bulk volume of about 20 mL, was heated in a quartz tube in a flow system to the chosen operating temperature. After a brief purge with nitrogen, a 90% methane/10% argon mixture was passed over the oxidant for a measured time, at the end of which the product gas was sampled by gas chromatography. The argon was present to supply an internal standard for the chromatography. The oxidant was regenerated between runs by passing air over it at operating temperatures for about 20 minutes, which appeared sufficient to fully regenerate it by reoxidation of the gallium.

Regenerated oxidants were generally as selective as fresh oxidant, but the activity was observed to decrease very slowly over a series of tests. Results for five runs are given in the Table (all data were obtained with regenerated oxidant). The Sample Time is the time the methane mixture was passed over the oxidant before a product sample was analyzed.

As can be seen, even at conversions over 95%, with a substantial excess of oxidant present, the selectivity is extremely high. In the last two runs, the quantity of methane that had passed over the oxidant was sufficient to have reduced only about 6% of the gallium oxide at the time the sample was taken.

Similar results were obtained with an oxidant of $Ga_2O_3$ supported on Alundum ® crystalline, nonporous alumina.

COMPARATIVE EXAMPLE

An indium oxide oxidant prepared and tested in a similar manner to the gallium oxide oxidant described above gave $CO_2/CO$ ratios of approximately unity at $CH_4$ conversions between 63 and 98%.

Other oxides, including those of manganese, bismuth, lead, and tin, resulted in the formation of $CO_2$ and $H_2O$ almost completely to the exclusion of CO and $H_2$; ethylene and ethane were also observed in those cases, particularly at conversions less than 20%. Thus with most of the metal oxides tested, the carbon oxide product was almost exclusively carbon dioxide even at partial conversion. Gallium oxide was unique in producing almost exclusively carbon monoxide even at high conversion.

TABLE

| Regen. Time (min.) | Regen. Temp. (°C.) | Sample Time (min.) | Run Temp. (°C.) | Feed Rate (ml/min.) (at 25° C.) | Feed $CH_4$ (%) | $CH_4$ Conversion (%) | $H_2/CO$ Ratio | $CO_2/CO$ Ratio | Yield of CO (%) | CO Selectivity (%) |
|---|---|---|---|---|---|---|---|---|---|---|
| 15 | 950 | 1.5 | 950 | 50 | 90 | 72 | 2.3 | 0.004 | 70 | 97 |
| 15 | 950 | 2.0 | 950 | 25 | 90 | 79 | 2.1 | 0.004 | 80 | 101 |
| 35 | 950 | 2.0 | 950 | 15 | 90 | 88 | 2.1 | 0.003 | 92 | 104 |
| 15 | 1000 | 2.0 | 1000 | 15 | 90 | 99 | 2.1 | 0.004 | 99 | 100 |
| 20 | 1000 | 2.0 | 1000 | 15 | 90 | 98 | 2.3 | 0.005 | 92 | 95 |

What is claimed is:

1. A process for the oxidation of natural gas which comprises contacting the natural gas with an oxidant comprising $Ga_2O_3$.

2. The process of claim 1 wherein the temperature is between 900° and 1100° C.

3. The process of claim 1 wherein the oxidant comprises $Ga_2O_3$ supported on a refractory oxide.

4. The process of claim 3 wherein the refractory oxide is alumina.

5. The process of claim 1 wherein the methane gas comprises methane.

6. The process of claim 1 wherein the oxidant is regenerated by air oxidation.

7. A process for the manufacture of synthesis gas having an $H_2/CO$ molecular ratio between about 1.9 and 2.4 and a $CO_2/CO$ molecular ratio less than about 0.1, which process comprises contacting natural gas with an oxidant comprising $Ga_2O_3$.

8. The process of claim 7 wherein the temperature is between 900° and 1100° C.

9. The process of claim 8 wherein the oxidant comprises $Ga_2O_3$ supported on a refractory oxide.

10. The process of claim 8 wherein the refractory oxide is alumina.

11. The process of claim 10 wherein the natural gas comprises methane.

12. The process of claim 8 wherein the oxidant is regenerated by air oxidation.

* * * * *